Figure 1:
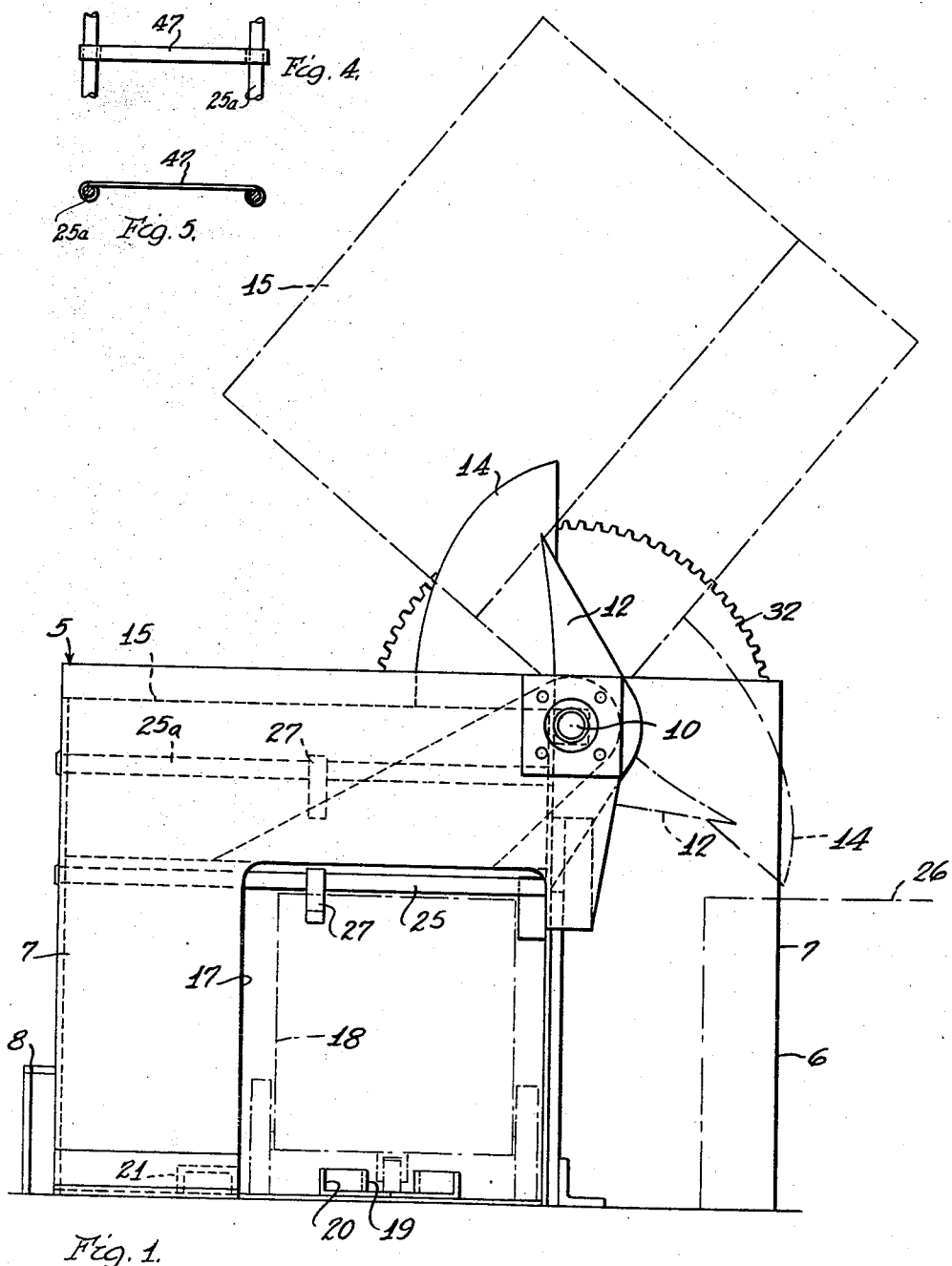

June 8, 1943.   D. R. KEAGY   2,321,300
MECHANICAL HANDLING DEVICE
Original Filed June 20, 1941   2 Sheets-Sheet 1

INVENTOR.
DAVID R. KEAGY
BY
John F. Stark

June 8, 1943.  D. R. KEAGY  2,321,300
MECHANICAL HANDLING DEVICE
Original Filed June 20, 1941   2 Sheets-Sheet 2

INVENTOR.
DAVID R. KEAGY
BY John F. Stark

Patented June 8, 1943

2,321,300

UNITED STATES PATENT OFFICE 2,321,300

MECHANICAL HANDLING DEVICE

David R. Keagy, Massillon, Ohio, assignor to Eaton Manufacturing Company, Cleveland, Ohio, a corporation of Ohio Substituted for abandoned application Serial No. 398,932, June 20, 1941. This application August 3, 1942, Serial No. 453,323

5 Claims. (Cl. 214—1.1)

This invention relates to conveyor mechanisms in general, and, more particularly, concerns a novel mechanism for use as a mechanical handling device in the manufacture of small articles, such as lock washers and the like. This application is a substitute for abandoned application Serial No. 398,932.

Heretofore in the manufacture and processing of small articles handling of large quantities of the articles in commercial production has been adequately accomplished in related stages of processing by the use of small so called "tote pans," round containers, or trucks. This has proved quite satisfactory except for certain articles, for example lock-washers and the like, which require heat treatment or tempering during manufacture, and such operation renders inconvenient the subsequent immediate manual handling of the hot article receptacles. It is simple enough to manually handle and empty several small tote pans of the articles to be heat treated when sent to the furnace, using as many pans as necessary to fill a larger container which receives the articles and is placed bodily in the furnace. However, it is when the hot container and its contents are taken from the furnace, or other elevated temperature operation, as an oil tempering bath, that immediate manual handling thereof is impossible. The present invention provides a means for obviating such difficulties by means of a novel mechanical handling mechanism.

One of the objects of this invention is the provision of a mechanical handling mechanism, including a rotatable conveyor means, arranged to receive a bulk article container therein and bodily rotate the loaded container and discharge its contents into a selected receptacle; the provision in a device as described above, of a universal handling means for reception and automatic retention of round or elongated rectangular truck-type bulk article containers of variable sizes; the provision in a mechanism as above described of an automatic stopping and reversing means for returning the movable dumping mechanism to its initial position after complete discharge of the article content.

Further and other objects and advantages of the present invention reside in the novel combination and arrangement of parts about to be described, when taken in conjunction with the accompanying drawings forming a part of this specification, and pointed out with particularity in the appended claims.

Figure 2:
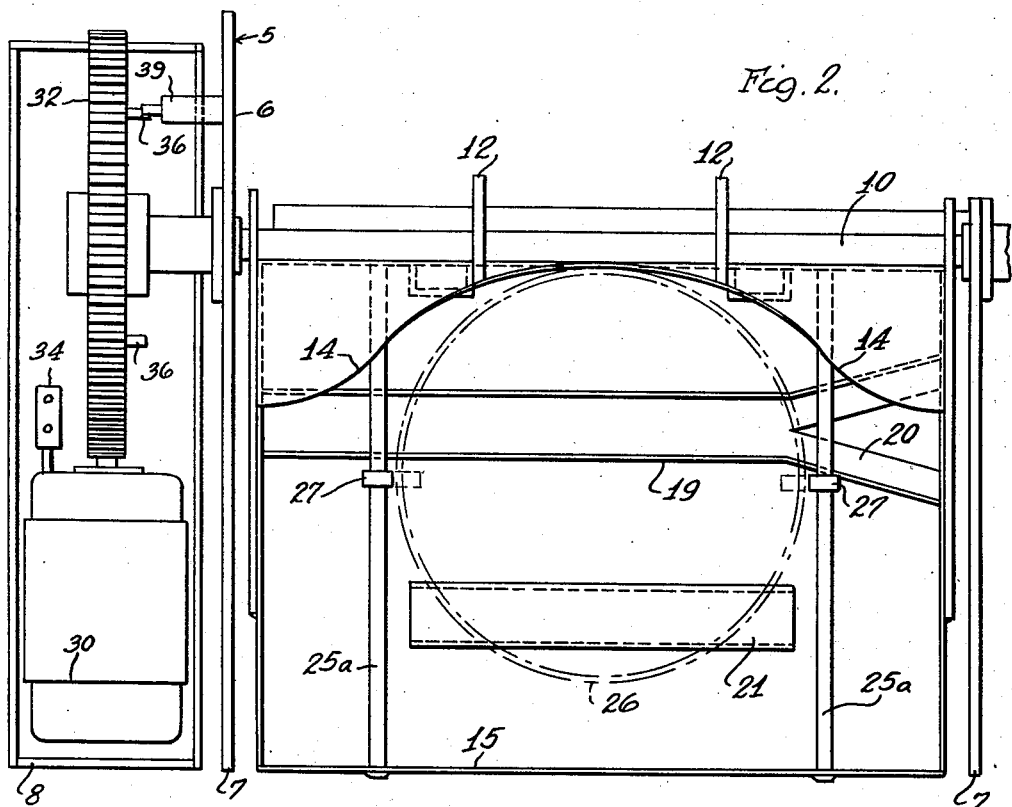
Figure 3:
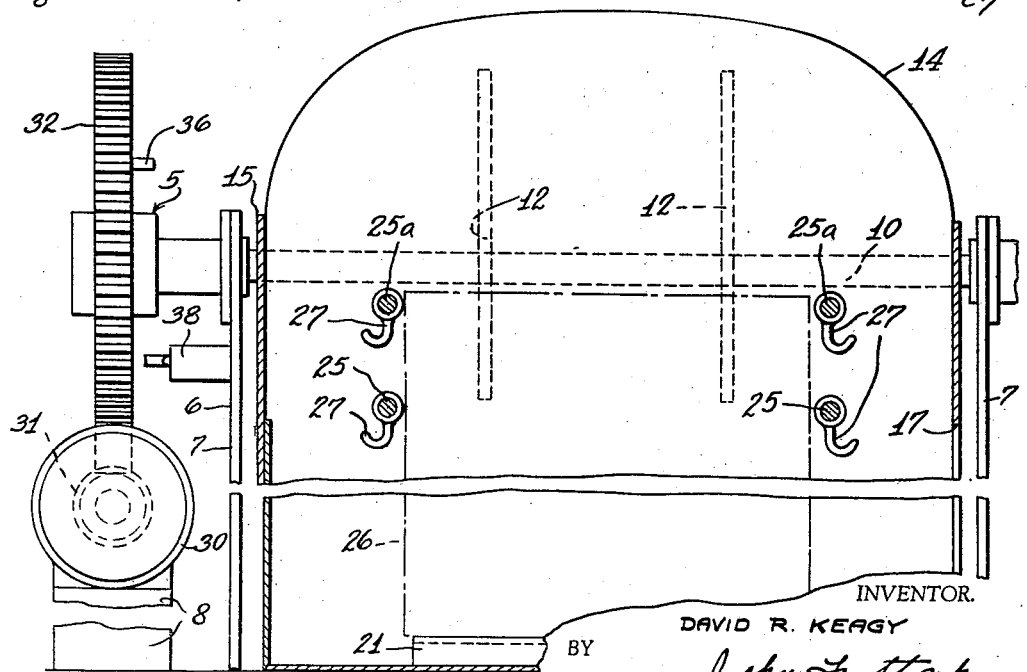

In the drawings like reference characters denote corresponding parts throughout the several views, and in which:

Fig. 1 is an end elevational view of a preferred form of apparatus of the present invention with a tote truck in initial position therein and other portions broken away to show details, and illustrating, in broken lines, the dumping mechanism in extended position; and Fig. 2 is a top plan view of the apparatus shown in Fig. 1; and Fig. 3 is a partially sectional side elevational view of the apparatus shown in Fig. 2 and revealing, in broken lines, a bulk article container in position therein.

Figs. 4 and 5 disclose plan and elevational views, respectively, of an alternative form of container retaining means.

In the drawings the mechanical handling apparatus is designated generally by the reference numeral 5, and, more particularly, has a simple framework or skeleton superstructure 6 consisting of spaced rectangular shaped plates 7 and a motor support 8 disposed parallel thereto and adjacent the outside face of one of said plates. The plates 7 serve as journals for mounting a rotatable shaft 10, which may be flatted at its central portion and non-rotatably fixedly threaded through reinforcements 12 fixed to the back of a cambered apron or pouring spout 14 on one side of the open top sheet metal box 15. As shown in the end view Fig. 1, one of the end plates 7 has a rectangular opening 17 cut therein of a size comparable to pass a small portable tote truck 18 therethrough, and in line with this opening is a second opening of similar size through the adjacent wall of the box 15 for receiving the truck completely within the confines thereof. A track member 19 on the bottom of the box has a V shaped entrance mouth 20 for centering the truck in the opening and keeping it in line as the truck is moved completely within the outer margins of the box. A second short piece of track 21 on the bottom of the box 15 and suitably located thereon is for a purpose to be presently described. A pair of rods 25 longitudinally spaced, as shown in Fig. 3, and extended transversely into opposite walls of the box 15 at a height to conveniently receive the tote truck 18 as shown in Fig. 1, serve as a retaining means to prevent the truck dropping out of the box when it is rotated to extended position for discharging the bulk contents.

As aforementioned the box 15 was designed to function somewhat universally, that is to say, for reception of either an elongated type rectangular tote truck 18 or a round container 26 as shown in broken lines in Figs. 2 and 3. Such containers 26 are generally used for handling of small bulk articles in tempering furnaces, which are charged from the top, being picked up and removed from the furnace by means of a crane. In this instance after coming from the drawing operation in the furnace the round container is hot and charged with hot treated articles and is mechanically set down in the box 15 by a crane in position between the rods 25, as shown. It will now be apparent that the short piece of track 21, previously mentioned, serves as a foot for the bottom of the container which rests in part on the other piece of track 19 and is thus supported in level position. It will also be apparent a second set of rods 25a, similar to rods 25 and disposed vertically thereabove, are located so as to be approximately in line with the top of container 26. Hook means 27 rotatably mounted on the lower rods 25 and the upper rods 25a, if desired, in selected axial position, are gravity actuated and automatically move into position over diametrically opposite points on the container rim for retaining the same when the box 15 is rotated to discharge the article content of the container. The hook means 27 on the rods 25, first mentioned, serve to accommodate containers of height different from that cared for by the rods 25a and hooks 27 thereon.

In certain instances it may be desirable to employ a rod 47 slidably supported on the upper transverse rods 25a, by loosely formed eyes upon opposite ends of the rod 47 wound over the rod 25a, instead of the aforementioned hook means 27, as optional means for automatically retaining the container 26 in the box 15, when it is rotated into dumping position. It will be apparent that as the box 15 and container 26 therein are rotated into dumping position the rod 47 which is loosely and slidably supported on the rods 25a, will slide down over the rim of the container 26 and automatically maintain it in position in the box 15. Upon reverse rotation of the box 15 to its original position the rod 47 need only be moved back out of the way from ver the rim of the container in order to effect the removal thereof by a crane or other lifting device.

The motor support 8 has a motor 30 of the reversible type secured thereto which may have a gear reduction box and coupling (not shown) on the motor shaft for driving a worm or pinion gear 31 at selected speeds. Meshed with the gear 31 is a large worm or spur gear 32 of suitable diameter, commensurate with the speed desired, and which is keyed or otherwise fixed on one end of the rotatable shaft 10. Manual switch means 34 control the starting and stopping of the motor while a limit control and reversing mechanism about to be described, regulates the safe extent of travel of the dumping mechanism and return to its initial position. In this instance a dog or pawl 36 on the inside of the large gear wheel 32, as best seen in Figs. 2 and 3, is arranged to actuate a limit control and reversing switch 38 secured to the adjacent face of frame plate 7 when the box 15 has reached the desired safe dumping position, and thereafter to cause the reversible motor to return the mechanism to its initial position where a switch 39 stops the operation.

The operation of the device is as follows: A tote truck full of small articles is wheeled into the opening in the side of the conveyor box and the motor started to actuate the box and bodily rotate it and the truck into dumping position to discharge its contents into a round container, in position as shown in Fig. 1; which container is then picked up by a crane and introduced into the furnace or other heat tempering operation. Upon removal from the furnace, the hot container and its contents are deposited by a crane into the box 15, as shown in Fig. 2, and the tote truck or other selected container placed where the container 26 was originally placed as shown in Fig. 1. The box and round container charged with hot articles is then bodily rotated, as in the previous instance, to discharge its contents into the waiting truck. It will be apparent no handling of hot articles after removal from the furnace is necessary and the operator has full control of the dumping mechanism to discharge all or any selected portion of the contents into one or more separate containers. Likewise, various size furnace containers and tote trucks may be used, within the limits of the design, without alteration of the combination dumping means.

From the foregoing disclosures it will be apparent there has been revealed a novel mechanical handling device which may be used in the processing of small articles, although it is not the intention to be limited to the specific use or embodiment of the invention herein described, which is merely for purposes of illustration, as many modifications will now suggest themselves in actual practice to those skilled in the art to which this invention relates, and formal modifications may be made without departing from the spirit and substance of the invention as defined by the scope of the following claims.

What I claim is:

1. A mechanical handling mechanism for emptying a receptacle charged with a plurality of bulk articles, said mechanism comprising a framework, powered means within said framework adapted for reception of the loaded receptacle, said powered means constituting a receptacle receiving means having a pair of spaced opposite side walls for reception of a round container, spaced rod means fixed transversely through said pair of opposite walls of said receptacle receiving means and mounting gravity actuated means automatically operable upon operation of the mechanism to retain said container in fixed position, and means for rotating said receptacle receiving means to discharge its contents while retaining the empty receptacle therein to be returned to its initial position.

2. A mechanical handling mechanism for emptying a receptacle charged with a plurality of bulk articles, said mechanism comprising a framework, powered means within said framework adapted for reception of the loaded receptacle, said powered means constituting a receptacle receiving means having a pair of spaced opposite side walls for reception of a round container, spaced rod means fixed transversely through said pair of opposite walls of said receptacle receiving means and mounting a plurality of gravity actuated means automatically operable upon operation of the mechanism to retain said container in fixed position, additional rod means and gravity actuated means mounted thereon located in vertical alinement with said first mentioned rod means for accommodating variable size round containers, and means for rotating said receptacle receiving means to discharge its contents while retaining the empty receptacle therein to be returned to its initial position.

3. A mechanical handling mechanism for emptying a receptacle charged with a plurality of bulk articles, said mechanism comprising a framework, powered means within said framework adapted for reception of the loaded receptacle, said powered means constituting a universal receptacle receiving means for receptacles of a circular or wheeled rectangular truck type, selectively, said universal receptacle receiving means including spaced guide and/or support means for each of said receptacle types, said guide means for directing said wheeled truck type receptacle fixed to the bottom wall of the receptacle receiving means, a second guide means duplicate in height to said first named guide means also fixed to the bottom of said receptacle receiving means and in spaced relation to said first guide means for supporting a flat bottom of said circular receptacle in level position thereon, and means for rotating said receptacle receiving means to discharge its contents while retaining the empty receptacle therein to be returned to its initial position.

4. A mechanical handling mechanism for emptying a receptacle charged with a plurality of bulk articles, said mechanism comprising a framework, powered means within said framework adapted for reception of the loaded receptacle, said powered means constituting a receptacle receiving means having a pair of spaced opposite side walls for reception of a round container, spaced rod means fixed transversely through said pair of opposite walls of said receptacle receiving means and slidably mounting gravity actuated hook means automatically operable upon operation of the mechanism to retain said container in fixed position, and means for rotating said receptacle receiving means to discharge its contents while retaining the empty receptacle therein to be returned to its initial position.

5. A mechanical handling mechanism for emptying a receptacle charged with a plurality of bulk articles, said mechanism comprising a framework constituting a pair of spaced plate members one of which has a rectangular opening through the wall thereof and a motor support adjacent the outside face of the other of said members, a receptacle receiving means disposed in said framework between said plate members having a pouring spout on one side thereof including an axle means fixed through a pair of opposite end walls of said receiving means and journalled in said plate members, said receptacle receiving means having a rectangular opening of comparable size and in line with the opening in said plate member for introduction of the loaded receptacle, a gear fixed to the end of said axle means for rotation therewith on the outside of said plate member adjacent said motor support, reversible motor means mounted on said support with a gear fixed on the motor shaft and meshed with said axle shaft gear for selectively operating the same, and means for rotating said receptacle receiving means with the loaded receptacle therein to discharge its contents while retaining the empty receptacle to be returned to its initial position.

DAVID R. KEAGY.